United States Patent Office 2,772,242
Patented Nov. 27, 1956

2,772,242
ELECTROLUMINESCENT ZINC SULFIDE PHOSPHOR

Keith H. Butler, Marblehead, Mass., assignor to Sylvania Electric Products Inc., a corporation of Massachusetts No Drawing. Application June 8, 1951, Serial No. 230,711

3 Claims. (Cl. 252—301.6)

This invention relates to electroluminescent phosphors, and particularly to those of the zinc sulphide type.

Such phosphors activated by manganese alone have been known to luminesce yellow when excited by a varying electric field. I have found, however, that the yellow luminescence can be tremendously increased by the addition of copper as a second activator, and that with the consequent joint activation the luminescence extends over a wide spectral band including the red.

The addition of a small amount of lead further improves the phosphor, and the use of a wash to dissolve free zinc oxide after firing also increases the luminescence. Such a wash can be a solution of acetic acid, ammonium acetate or other material which dissolves the oxide without dissolving zinc sulfide. A small amount of zinc oxide can be added to the ingredients before firing, but the luminescent brightness of the washed phosphor will be about the same whether or not the oxide is added. However, the phosphor made without the oxide will have a good brightness and low conductivity without the wash, whereas the phosphor with the oxide will have excessive conductivity, making it difficult or impossible to determine the brightness.

The wash removes the free zinc oxide and lightens the color of the powder. Although an atmosphere of a relatively inert gas such as nitrogen, argon, or neon is flushed over the phosphor ingredients during firing, a small amount of oxidation still occurs, so that the improvement noted in washing the phosphor made without initial oxide may be due to removal of the small amount of oxide formed during the firing.

As one specific example of the preparation of a phosphor according to the invention, I mix the following ingredients as fine powders in the molar proportions given:

ZnS _____ 1.00
PbCO₃ _____ 0.002
CuO _____ 0.001
MnCO₃ _____ 0.005

The zinc sulfide used contains about 3.15% zinc chloride by weight, although other amounts can be used.

The mixture is fired by being moved at a rate of about an inch per minute through a six-foot silica tube, three inches in diameter with a quarter-inch wall, and heated over its middle section, for a length of about four feet, to a temperature of about 1720° C. The mixture passes through the tube in trays six inches long, two inches wide and one and one-half inches deep. One end of the silica tube is left open, and the trays are fed into that end; the other end is closed by an air lock with a sliding gate at each end to avoid disturbing the flow of inert gas through the tube when trays are removed. The gas enters the tube through a pipe at the closed end and flows in a direction opposite to that of the movement of the trays.

The luminescence will be improved if the phosphor cake formed by the firing is crushed, thoroughly mixed and then fired again in the same manner.

The fired phosphor is then lightly crushed to break down large aggregates and to separate its particles and is boiled with a hot 5% aqueous solution of acetic acid, dissolving away most of the free zinc oxide. The mixture is filtered and washed on the filter with two portions of an aqueous ½% acetic acid solution, and then washed twice with distilled water. The acid wash lightens the color of the phosphor and improves its luminescence, as shown in the table below:

Table I

| Run No. | Untreated powder | | Treated powder | |
|---|---|---|---|---|
| | Light | Current | Light | Current |
| B | 67 | 162 | 110 | 200 |
| C | 44 | 140 | 86 | 162 |
| D | 44 | 175 | 96 | 200 |
| E | (¹) | (¹) | 108 | 190 |
| F | 39 | 150 | 63 | 160 |

¹ Excessive current.

In making the measurements given in the above table, the powdered phosphor was mixed with cold pressed castor oil, and the mixture placed between a metal plate and a piece of conducting glass with spacers between, so as to form a cell 0.010 inch thick, the area of the metal plate being about five square inches. An alternating voltage of 500 volts, 60 cycles per second was applied and the light output measured by a phototube. The current through the cell was measured by a microammeter.

The composition of the mixtures used in making the various samples used in Table I is given in Table II below, together with that of some additional samples, and the corresponding light outputs and currents for acid-treated powders.

Table II

| Run No. | Moles in blend | | | | | Output from cell | |
|---|---|---|---|---|---|---|---|
| | ZnS | ZnO | PbCO₃ | CuO | MnCO₃ | Light | Current |
| A | 1.00 | None | .004 | None | .01 | None | 120 |
| B | 1.00 | None | .004 | .001 | .01 | 110 | 200 |
| C | 1.00 | None | .004 | .0005 | .01 | 86 | 162 |
| D | 1.00 | None | .004 | .0013 | .01 | 96 | 200 |
| E | 0.95 | 0.05 | .004 | .001 | .01 | 108 | 190 |
| F | 1.00 | None | .004 | .001 | .02 | 63 | 160 |

The light output without copper is seen from the above table to be substantially negligible, and measurements by another method more sensitive to low brightness show that the addition of the copper appears to increase the luminescent brightness about 50 times.

The color of the luminescence is indicated in Table III below for samples of various manganese contents, including sample D from the previous table.

Table III

| Run No. | Moles in blend | | | | | Luminescent color |
|---|---|---|---|---|---|---|
| | ZnS | ZnO | PbCO₃ | CuO | MnCO₃ | |
| G | 0.95 | 0.05 | .004 | .001 | .0012 | Yellowish green. |
| H | 0.95 | 0.05 | .004 | .001 | .0025 | Greenish yellow. |
| I | 0.95 | 0.05 | .004 | .001 | .0050 | Yellow. |
| D | 1.00 | None | .004 | .001 | .0200 | Yellow. |

The effect of variation in the lead content is clear from Table IV below. The luminescent output can be nearly doubled by adding about 0.004 mole of lead for each mole of ZnS.

Table IV

| Moles in blend | | | | Output from cell | |
|---|---|---|---|---|---|
| ZnS | PbCO$_3$ | CuO | MnCO$_3$ | Light | Current |
| 1.00 | None | .00125 | .005 | 59 | 225 |
| 1.00 | .0005 | .00125 | .005 | 45 | 230 |
| 1.00 | .0010 | .00125 | .005 | 68 | 225 |
| 1.00 | .0020 | .00125 | .005 | 85 | 230 |
| 1.00 | .0040 | .00125 | .005 | 96 | 200 |
| 1.00 | .008 | .00125 | .005 | 83 | 205 |

All the phosphors in the table above were made by the single firing method described above. The difference in luminescence between the phosphors fired once and fired twice, is shown by the following Table V, where it appears that phosphors low in copper are especially improved by double firing. The moles of lead and copper compounds used are given per mole of zinc sulfide. The moles of manganese carbonate present, on the same basis, was 0.005.

Table V

| Moles PbCO$_3$ | Moles CuO | Single firing | Double firing |
|---|---|---|---|
| 0.002 | 0.0003 | 0 | 50 |
| 0.002 | 0.0006 | 0 | 105 |
| 0.002 | 0.0009 | 18 | 110 |
| 0.002 | 0.0012 | 85 | 145 |
| 0.000 | 0.0012 | 59 | 120 |
| 0.0005 | 0.0012 | 45 | 135 |
| 0.001 | 0.0012 | 68 | 130 |
| 0.002 | 0.0012 | 85 | 140 |
| 0.004 | 0.0012 | 96 | 128 |

Phosphors high in manganese are also improved greatly by double firing. The spectral energy distribution of the light emitted by the phosphors of the present application covers a broad band, extending into the red, so that a good red luminescence can be produced by using a red filter in front of a lamp using such a phosphor.

Mixtures of these yellow electroluminescent phosphors with the blue electroluminescent phosphors described in an application of Keith H. Butler and Horace H. Homer, filed concurrently herewith, give an excellent white luminescence. The brightness of such white phosphors is greatly improved by use of a higher frequency of excitation than 60 cycles per second, without giving any appreciable change in color.

Such a white phosphor, or the yellow phosphor itself, is suitable for use in the electroluminescent lamp of an application by Erwin F. Lowry, Eric L. Mager and Keith H. Butler filed concurrently herewith.

Instead of the acid wash described above, the powder can be washed in ammonium acetate or other agents as shown in copending application, Serial No. 180,783, filed August 22, 1950, by Elmer F. Payne.

The phosphor described herein has proven very effective when immersed in a solid dielectric material such as nitrocellulose, waxes, and plastics of high resistivity, dielectric constant and dielectric strength, and then excited by a varying or alternating voltage, as in the electroluminescent lamp described in the above-mentioned application of Elmer F. Payne, or in an application filed concurrently herewith by Erwin F. Lowry, Eric L. Mager and Keith H. Butler.

Phosphors such as described herein can have a copper content between about 0.0003 to 0.0015 gram-atom of copper, about 0.0001 to 0.03 gram-atom of manganese and between about 0.0000005 and 0.00005 gram atom of lead, per mole of zinc sulfide.

What I claim is:

1. An electroluminescent phosphor comprising zinc sulfide containing between about 0.0003 to 0.0015 gram-atom of copper actuator, about 0.0001 to 0.03 gram-atom of manganese activator and between about 0.0000005 and about .00005 gram atom of lead, per mole of zinc sulphide.

2. The method of making a yellow-electroluminescent phosphor, comprising the steps of mixing zinc sulfide with about 0.0003 to about 0.0015 gram atom of copper, about 0.0001 to 0.03 gram atom of manganese and between about 0.0000005 and to 0.00005 gram-atom of lead per each gram-mole of zinc sulfide, firing at between about 1650° F. to 1850° F., then washing the phosphor in a reagent capable of dissolving the zinc oxide without dissolving zinc sulfide.

3. The method of claim 2, in which the phosphor is remixed and refired between the firing step and the washing step.

References Cited in the file of this patent

UNITED STATES PATENTS

| 1,944,281 | Stephens | Jan. 23, 1934 |
| 2,447,322 | Fonda | Aug. 17, 1948 |

FOREIGN PATENTS

| 873,860 | France | July 22, 1942 |

OTHER REFERENCES

Destriau: Phil. Mag., vol. 38, pp. 706–711.